(12) United States Patent
Nagarathinam

(10) Patent No.: US 12,081,822 B2
(45) Date of Patent: Sep. 3, 2024

(54) SERVICE SWITCHING FOR CONTENT OUTPUT

(71) Applicant: ARRIS ENTERPRISES LLC, Suwanee, GA (US)

(72) Inventor: Yuvaraj Nagarathinam, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 131 days.

(21) Appl. No.: 17/791,259

(22) PCT Filed: Dec. 18, 2020

(86) PCT No.: PCT/US2020/065841
§ 371 (c)(1),
(2) Date: Jul. 7, 2022

(87) PCT Pub. No.: WO2021/141752
PCT Pub. Date: Jul. 15, 2021

(65) Prior Publication Data
US 2023/0031530 A1 Feb. 2, 2023

Related U.S. Application Data

(60) Provisional application No. 62/958,491, filed on Jan. 8, 2020.

(51) Int. Cl.
*H04N 21/426* (2011.01)
*H04N 5/50* (2006.01)
*H04N 21/462* (2011.01)

(52) U.S. Cl.
CPC ........... *H04N 21/4263* (2013.01); *H04N 5/50* (2013.01); *H04N 21/4621* (2013.01)

(58) Field of Classification Search
CPC .......... H04N 21/4263; H04N 21/4384; H04N 21/44209; H04N 21/4621; H04N 21/4622; H04N 5/50
See application file for complete search history.

(56) References Cited

U.S. PATENT DOCUMENTS 3,811,090 A * 5/1974 Uchida ................ H04N 5/63
348/730
4,331,977 A * 5/1982 Cohn ................... H04N 5/63
348/730

(Continued)

FOREIGN PATENT DOCUMENTS

EP 2890143 A1 7/2015
KR 20150023703 A 3/2015
KR 20180057081 A 5/2018

OTHER PUBLICATIONS

Extended European Search Report, dated Dec. 1, 2023, issued in corresponding European Application No. 20912989.9, 8 pages.

(Continued)

*Primary Examiner* — Michael B. Pierorazio
(74) *Attorney, Agent, or Firm* — Panitch Schwarze Belisario & Nadel LLC

(57) ABSTRACT

Methods, systems, and computer readable media may be operable to facilitate switching the video and audio output to a different service when a current service is not presentable. When outputting content from a first service, a multimedia device may identify and switch to an output of content from a second service when the content from the first service becomes unpresentable. The multimedia device may continue to monitor the quality or presentability of the content from the first service, and the multimedia device may switch from an output of content form the second service to an (Continued)

output of content from the first service when the determination is made that the content from the first service is presentable.

20 Claims, 8 Drawing Sheets

(56) References Cited

U.S. PATENT DOCUMENTS

| | | | | |
|---|---|---|---|---|
| 4,439,784 | A * | 3/1984 | Furukawa | H04N 7/16 725/38 |
| 5,475,364 | A * | 12/1995 | Kenet | G08B 19/005 340/567 |
| 6,002,380 | A * | 12/1999 | Lee | H04N 3/22 345/13 |
| 6,076,169 | A * | 6/2000 | Lee | G06F 1/3215 713/320 |
| 6,205,318 | B1 * | 3/2001 | Schindler | H04N 21/43615 348/E5.103 |
| 6,259,486 | B1 * | 7/2001 | Mahvi | H04N 5/44 348/730 |
| 7,411,631 | B1 * | 8/2008 | Joshi | G06F 1/3203 348/730 |
| 7,730,507 | B2 * | 6/2010 | Sakai | H04N 5/63 348/730 |
| 2005/0132420 | A1 * | 6/2005 | Howard | G06F 3/017 348/E5.103 |
| 2005/0243081 | A1 * | 11/2005 | Cha | H04N 5/63 345/212 |
| 2006/0140452 | A1 * | 6/2006 | Raynor | G06F 1/3203 382/115 |
| 2007/0152994 | A1 * | 7/2007 | Koh | G09G 5/006 348/E5.127 |
| 2008/0235733 | A1 * | 9/2008 | Heie | H04N 21/482 725/46 |
| 2009/0010671 | A1 * | 1/2009 | Hashimoto | G06F 1/3203 713/300 |
| 2009/0021649 | A1 * | 1/2009 | Lee | H04N 5/63 348/730 |
| 2009/0316796 | A1 * | 12/2009 | Taleb | H04N 21/4435 375/E7.027 |
| 2010/0196038 | A1 * | 8/2010 | Yamaguchi | G03G 15/2039 399/69 |
| 2010/0260254 | A1 * | 10/2010 | Kimmich | H04N 19/164 375/240 |
| 2010/0306558 | A1 * | 12/2010 | Kang | G06F 1/3203 713/300 |
| 2011/0141377 | A1 | 6/2011 | Maruyama et al. | |
| 2011/0149753 | A1 * | 6/2011 | Bapst | H04H 20/22 370/252 |
| 2011/0179300 | A1 * | 7/2011 | Suzuki | G11B 17/056 713/323 |
| 2012/0185907 | A1 * | 7/2012 | Park | H04N 21/242 725/110 |
| 2012/0272285 | A1 | 10/2012 | Brooks et al. | |
| 2014/0210754 | A1 * | 7/2014 | Ryu | G06F 1/1626 345/173 |
| 2014/0245041 | A1 * | 8/2014 | Ayalur | G06F 1/3206 713/323 |
| 2017/0026445 | A1 | 1/2017 | Soroushian et al. | |

OTHER PUBLICATIONS

Notification of Transmittal of the International Search Report and the Written Opinion of the International Searching Authority, or the Declaration, dated Apr. 19, 2021, in corresponding International Application No. PCT/US2020/065841, 10 pps.

* cited by examiner

SERVICE SWITCHING FOR CONTENT OUTPUT

TECHNICAL FIELD

This disclosure relates to switching from high-resolution to low-resolution output of content.

BACKGROUND

Service providers of DVB (digital video broadcasting) satellite service, transmit content of different resolutions at the same time (simulcast) for the following reasons: to give users the option of subscribing to various resolutions (e.g., though a user may have a set top box (STB) capable for decoding HD (high-definition) content, the user may be interested in only viewing the SD (standard-definition) channels); the service provider when launching a service (program) at higher resolution (e.g., UHD (ultra-high-definition)/HD), tend to charge a premium for the higher resolution service, and not all users would be ready to avail the service at the higher cost and thus the service provider would require keeping the legacy services of lower resolution to support the existing customers); services of new resolution (e.g., UHD), requires special HW (hardware) to decode UHD videos and the STBs currently deployed may not be able to support these; services of new resolution (e.g., UHD) is usually coupled with new modulation and coding standards (e.g., DVB-S2x) which may not be supported by the STBs that are already deployed. Because of the above reasons, simulcast is preferred and it will continue to be selected by service providers.

During HD penetration, to transmit the HD programs efficiently, service providers moved their transponders from DVB-S to DVB-S2. So, to view HD channels, the customers were required to buy new STBs which were capable of decoding DVB-S2 signal while also being capable of decoding HD video and Dolby AC3/AC3+ audio. In the same line, deployment of UHD services may require that these services are transmitted in a higher coding and modulation scheme compared to the HD channels, in order to increase data bandwidth. For example, a higher modulation scheme (e.g., DVB-S2x 16PSK and DVB-S2x 32PSK modes) may be used for transmitting UHD channels. Thus, simulcast may be utilized in order to provide both HD and UHD services.

FIG. 1 shows two charts representing how noise affects the SNR (Signal to noise ratio). During rain or any other fading condition, the noise floor increases as shown in the chart on the right-hand side, and the noise floor gets close to the wanted signal, making it difficult for the DEMOD to decode the signal. This leads to macro-blocking of the video and when the SNR drops lower, the DEMOD would lose lock.

FIG. 2 shows a chart representing, when the SNR reduces in steps (i.e., when the gap between the wanted signal and noise narrows), content that is transmitted in 8-PSK gets more errors and starts to macroblock first, before the content that is transmitted in QPSK starts to macroblock. Applying this to the context of content that is transmitted in both SD and HD, it can be inferred that during moderate raining (other fading) conditions, the HD channel, transmitted using 8PSK gets affected and starts to macro block, though the SD channel, transmitted using QPSK will still be presentable. As shown in FIG. 2, when the SNR (Eb/N0) is 9 dB, HD channel transmitted in 8PSK would have started to macroblock whereas the SD channel, transmitted in QPSK would be presentable.

The present approach requires that the customer remember the program number of SD equivalent service, of the HD channel that is being viewed, and then manually switch to the SD equivalent when the effects of fading is high enough to affect the HD content that is presented. Alternatively, a user can add the SD equivalent service to the favorite channel list and zap by traversing through the FAV channel list, but the number of entries in the FAV channel list is usually limited to 15 or 20 and thus adding all the SD equivalent channels would reduce the number of HD channels that can be added to the FAV channel list.

In most of the cases, the customer would wait for complete loss of signal, before switching from the higher resolution content to the lower resolution content. Most customers may not know that the low-resolution equivalent is still viewable and thus switch off the STB during rain, or wait for the high-resolution content to recover. The present approach requires manual intervention and the TV viewing experience of the user is affected. Further, during a scheduled recording, though an alternative low-resolution content is available for recoding, no step is taken to record it. For a customer who has zapped to the low-resolution content, to switch back to the high-resolution content, the customer must zap between the HD and SD equivalents periodically, to check the integrity of the HD content to switch back to the HD content. This again reduces the viewing experience of the user. Once a transponder is affected by noise, and when a new channel change request to a program available in the same transponder is issued, the present solution tries to tune to the channel and then display a "NO-Signal" banner, though we know that the transponder is affected by noise. Therefore, a need exists for methods and systems operable to facilitate an efficient and user-friendly switching of a content output between a high-resolution program and a low-resolution program.

DETAILED DESCRIPTION

It is desirable to provide methods and systems operable to facilitate an efficient and user-friendly switching of a content output between a high-resolution channel and a low-resolution channel. Methods, systems, and computer readable media may be operable to facilitate switching the video and audio output to a different service when a current service is not presentable. When outputting content from a first service, a multimedia device may identify and switch to an output of content from a second service when the content from the first service becomes unpresentable. The multimedia device may continue to monitor the quality or presentability of the content from the first service, and the multimedia device may switch from an output of content from the second service to an output of content from the first service when the determination is made that the content from the first service is presentable.

Figure 3:
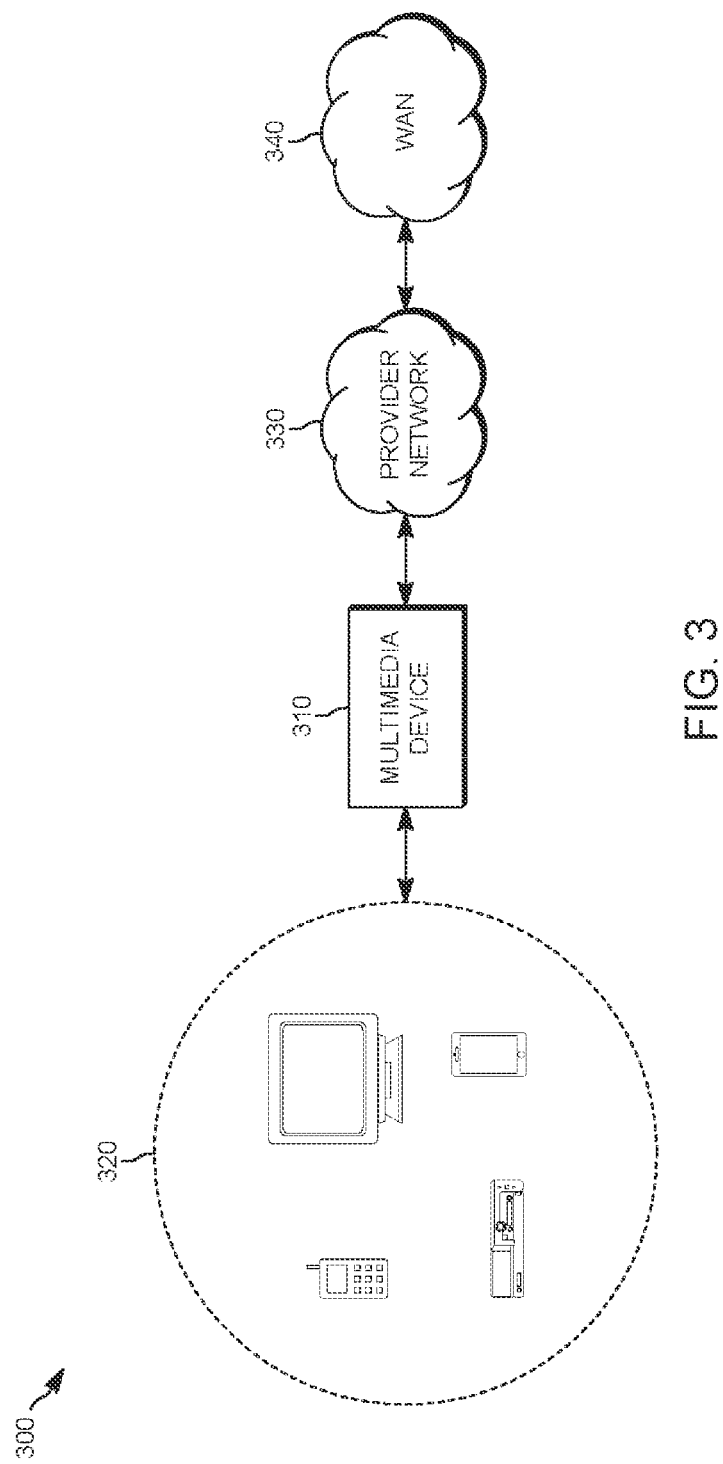
FIG. 3 shows an example network that is operable to facilitate switching the video and audio output to a different service when a current service is not presentable.

FIG. 3 shows an example network 300 that is operable to facilitate switching the video and audio output to a different service when a current service is not presentable. In embodiments, a multimedia device 310 may be configured to provide multimedia services to one or more client devices 320. The multimedia device 310 may include a multimedia or residential gateway, a set-top box (STB), or any other device configured to receive, store, and/or deliver multimedia content to one or more client devices 320. Client devices 320 may include televisions, computers, tablets, mobile devices, STBs, game consoles, and any other device configured to receive a multimedia service.

In embodiments, multimedia content may be delivered from a multimedia device 310 to one or more client devices 320 over a local network (e.g., a local area network (LAN), a wireless local area network (WLAN), a personal area network (PAN), etc.). The multimedia device 310 may receive services from and may communicate with an upstream wide area network (WAN) 340 through a connection to a provider network 330. It should be understood that the multimedia device 310 may operate as an access point to wirelessly deliver multimedia content to one or more client devices 320 that are associated with the multimedia device 310 as stations.

In embodiments, a multimedia device 310 may communicate with a client device 320 over a wired or a wireless connection. The multimedia device 310 may provide one or more channels or service sets through which services and communications may be delivered wirelessly to one or more client devices 320. A client device 320 may associate and authenticate with a multimedia device 310 or associated access point (e.g., wireless router, network extender, etc.), after which communications and services may be delivered from the multimedia device 310 to the client device 320. It should be understood that various protocols and/or standards (e.g., Wi-Fi, multimedia over coax alliance (MoCA), Zig-Bee, etc.) may be used to deliver communications between a multimedia device 310 and client device 320.

A multimedia device 310 may output live or linear content to a client device 320 as the content is received at the multimedia device 310, or the multimedia device 310 may store (i.e., record) content and output the stored content to a client device 320 at a later time. For example, content may be recorded and stored at the multimedia device 310, wherein the content may be conditioned or transcoded into a format that is compatible with one or more client devices 320.

In embodiments, the multimedia device 310 may receive a piece of multimedia content as a stream, and the stream carrying the piece of content may be received through one of one or more tuners of the multimedia device 310. The multimedia device 310 may include a single tuner or a plurality of tuners, and each tuner may be tuned to a channel over which a stream carrying a piece of media content may be received. As an example, where the multimedia device 310 has more than one tuner, a user may view content from a first channel on a display device connected to the multimedia device 310 while the multimedia device 310 records content received over one or more other channels. As another example, where the multimedia device 310 has more than one tuner, the multimedia device 310 may record content from a number of channels equal to the number of tuners in the multimedia device 310. It should be understood that a tuner may be a single device used to capture information related to a channel or program, or the tuner may be a virtual tuner that uses IP (Internet protocol) or other protocols to access information related to a specific channel or program. For example, for a device attached to a hybrid fiber coaxial (HFC) network, a narrowband quadrature amplitude modulation (QAM) tuner, a wideband tuner, or a collection of narrowband tuners can be used to access a program stream within a data over cable service interface specification (DOCSIS) bonded channel. Other implementations using other broadband access networks may not use explicit tuners, but can extract the relevant channel or program information directly from an IP network.

In embodiments, a multimedia device 310 (e.g., STB) may output video and/or audio associated with a piece of content to one or more client devices 320 (e.g., display devices such as televisions, tablets, mobile devices, other STBs, etc.). The content may be received by the multimedia device 310 through a connection to a provider network 330, and the content may be provided by one or more content sources within a WAN 340.

The multimedia device 310 may have a single tuner and/or a single DEMOD, or the multimedia device 310 may have multiple tuners and/or multiple DEMODs. When a channel change request is received at the multimedia device 310, a determination may be made whether a free tuner is available to the multimedia device 310. A free tuner may be available to the multimedia device 310 when the multimedia device 310 has a tuner tuned to the requested channel and still has at least one other tuner that is not being utilized to output content to a client device 320 or otherwise reserved for recording another piece of content.

For a multimedia device 310 having a free tuner or frontend (e.g., tuner and DEMOD combination), every time a channel change request is issued, the primary frontend is used to lock to the high-resolution (e.g., HD) channel associated with the channel identified in the channel change request, and if a lower resolution (e.g., SD) equivalent of the service is available, then another frontend is used to tune to the equivalent lower resolution service. Also, based on availability of resources, free PID filters, video and audio decoders can be used to start the video and audio decoding process for the lower resolution service before the actual switching process. This helps in making the switching process look seamless.

For a multimedia device 310 without a free frontend (e.g., Zappers/PVRs (personal video recorders) where all the tuner+DEMOD are busy), when the quality of the high-resolution (e.g., HD) service drops below a certain level, the same frontend is used to switch to the equivalent lower resolution (e.g., SD) service. The tuning of the frontend from the high-resolution (e.g., HD) service to the lower resolution service is done without the user's intervention.

The determination as to when to initiate the switch from the high-resolution program to the low-resolution program or vice versa, is based on an algorithm. This algorithm takes into account one of more of the following signal statistic data from the frontend for both the high-resolution signal and the low-resolution signal: RS uncorrectable errors; RS corrected errors; Signal to Noise ratio (SNR); tuner lock status; DEMOD/FEC lock status; and/or others. The algorithm may use some/all of the parameters mentioned above to make the decision as to whether the content that is being transmitted in the signal being monitored is presentable to the user or not. Additionally, the algorithm may use one or more of the following parameters: video decoder error count; audio decoder error count.

Based on the output from the algorithm, an event is raised when the signal conditions get poor (e.g., when the quality of the signal falls below a threshold level). Once the event is triggered, if free PID filters and video/audio decoders are available to the multimedia device 310, then these resources are used to decode the low-resolution (e.g., SD) content. At this point, the display (e.g., the output to one or more client devices 320) is still playing the high-resolution content (e.g., HD). Once the low-resolution (e.g., SD) video is fit to be presented (e.g., after a short period of time such as 2 seconds for the video and audio decoders to stabilize and decode the first 'I' frame), the output path is switched from the primary decoders to the second set of decoders. Where free PID filters and video/audio decoder resources are not available, the same video and audio decoders that are used to decode the high-resolution content (e.g., HD) content are used to decode the low-resolution (e.g., SD) content, but the content is routed from the second frontend, that is locked to the signal carrying the low-resolution (e.g., SD) service. Where a free frontend resource is not available, the same frontend resource that is being used to lock to the high-resolution content (e.g., HD) content is used to lock to the low-resolution (e.g., SD) content.

In the case of a multi-frontend multimedia device 310 with a free frontend resource, after switching to the low-resolution content, the high-resolution signal condition is monitored periodically (through the first frontend resource that is locked to the high-resolution content), using the same algorithm described above. When the signal conditions recover to the point that determination is made that the high-resolution content is presentable, the high-resolution content is routed from the frontend locked to the high-resolution signal. Again, if free PID filters and video/audio decoders are available, the switch-over can be made as seamless as possible by continuing to decode the high-resolution content using the free PID filters and video/audio decoders.

In the case where a free frontend resource is not available, the user may be notified and the user can manually switch to the high-resolution content (e.g., HD) equivalent when the signal conditions for the high-resolution content (e.g., HD) content recover.

After a transponder is affected by noise, when making a new channel change request, a check is done to see if the signal of the new program belongs to the affected transponder list (a list maintained by the multimedia device 310, wherein the list comprises an identification of one or more transponders experiencing a drop in signal quality below a threshold level). If the new program is from the list of affected transponders, if an equivalent low-resolution service is available, the low-resolution program is picked and displayed to the user. The same applies to scheduled recordings, which start after the signal from the transponder carrying high-resolution is affected by noise (e.g., fading). By switching to, and displaying a low resolution offering of a program in response to a determination that a high resolution offering of the program has been negatively affected by noise, the user is presented with the best signal available.

The algorithm described above can be used to trigger switching between services of different transmission standards for multi-standard products (e.g., DVB-S2 (satellite) and DVB-T2/ISDB-T (Terrestrial) products where there are redundant transmissions in both satellite mode, cable mode and terrestrial mode). The algorithm described above can be used to trigger switching between services of different PLP (Physical layer pipe) of DVB-T2 and DVB-S2, DVB-S2x, and others.

A list of alternative services that can be decoded by the multimedia device 310 is transmitted as user defined descriptor of SI (Service Information). The multimedia device 310 may utilize an algorithm to uniquely identify a service from any of the MPTS's. A list/array of entries can be used to uniquely identify the different services of the same content with different or same resolution, across different TS's, transmitted through satellite transponders or terrestrial channels or cable channels. A new descriptor can be used to transmit this data and the data can be sent as part of SDT (Service Descriptor Table) and MW code may be modified, to decode the new user defined table and create a dynamic table which is looked up during channel change to identify the alternative services.

As an example, when a multimedia device 310 has 3 frontends, the second frontend is used to tune to the signal which carries the low-resolution content, when a channel change command to lock to the high-resolution channel is issued. The signal conditions of the primary channel (in this case, the high-resolution channel), locked by the first frontend is monitored in a thread. When the signal conditions get worse (i.e., the signal conditions drop below a threshold level), the same video and audio decoders are reconfigured to decode data from the SD transponder (second tuner). One of the signal generator (e.g., SFU) is used to simulate an HD transponder by setting it to DVB-S2 8PSK 3/5 (same setting as used for an HD transmission) and the other signal generator (e.g., SFU) is used to simulate an SD transponder by setting it to DVB-S QPSK ¾ (same as used for an SD transmission). When reducing the SNR on both the SFUs, at, for example, 6.7 dB SNR, the HD signal starts to macroblock, and further reducing the SNR triggers the HD-to-SD switchover algorithm and the SD program is displayed without the user's intervention. In embodiments, the algorithm does not wait for a loss of signal, but the decision is made when the number of macro-blocks in the video are high enough to affect the viewing experience. Similarly, when the SNR is increased from, for example 6.5 dB to 7.5 dB, the HD signal is clear without errors, the algorithm detects that the signal is fit to be presentable and triggers the switch-over algorithm to display the HD signal.

Figure 4:
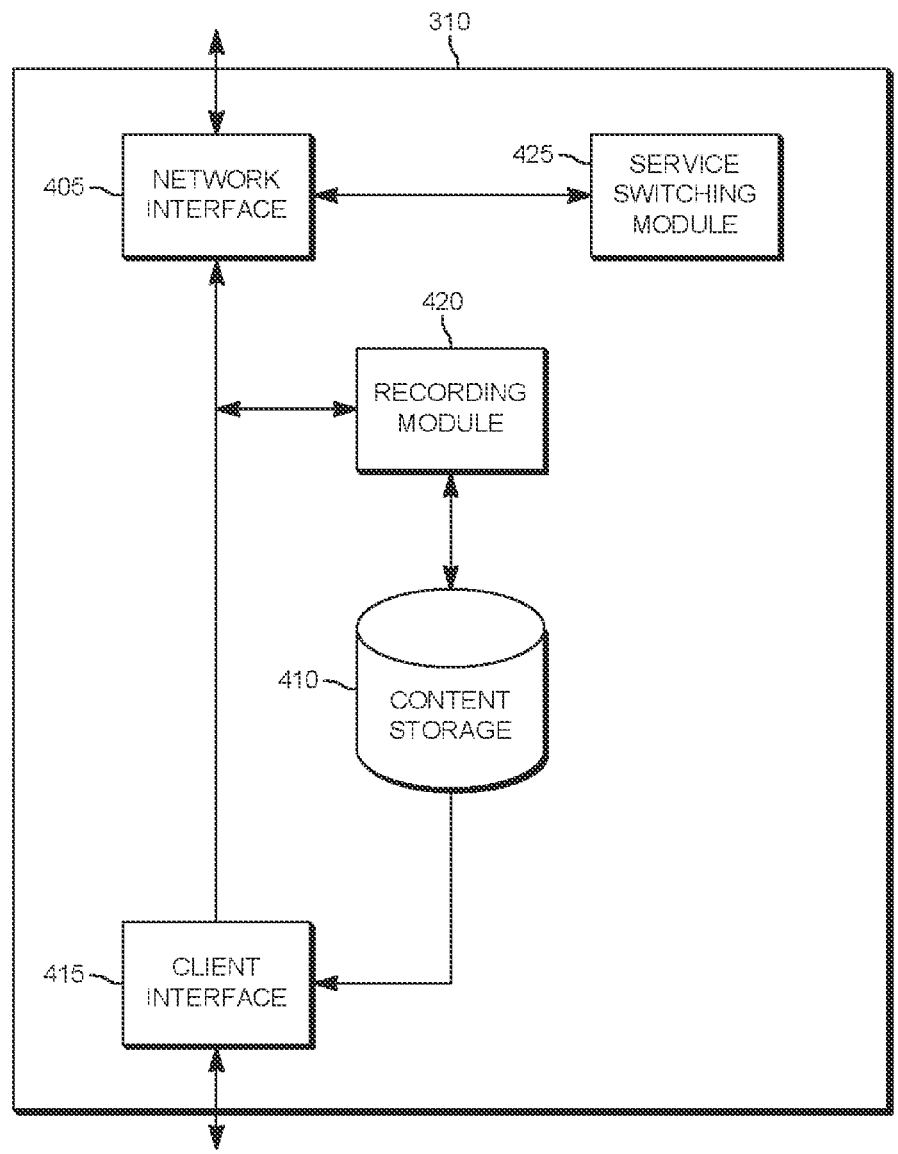
FIG. 4 is a block diagram illustrating an example multimedia device operable to facilitate switching the video and audio output to a different service when a current service is not presentable.

FIG. 4 is a block diagram illustrating an example multimedia device 310 operable to facilitate switching the video and audio output to a different service when a current service is not presentable. The multimedia device 310 may include a network interface 405, content storage 410, a client interface 415, a recording module 420, and a service switching module 425. The multimedia device 310 may include a multimedia or residential gateway, a set-top box (STB), or any other device configured to receive, store, and/or deliver multimedia content to one or more client devices 320 of FIG. 3.

In embodiments, content may be received at the multimedia device 310 from an upstream network (e.g., provider network 330 of FIG. 3, WAN 340 of FIG. 3, etc.) through the network interface 405. Communications and services received through the network interface 405 may be forwarded to one or more display or client devices (e.g., client devices 320 of FIG. 3) through the client interface 415. For example, content streams (e.g., live or linear content, VoD content, recorded content, etc.) may be recorded by the multimedia device 310 and stored at content storage 410, and/or the content streams may be forwarded to one or more client devices 320 through the client interface 415.

In embodiments, the network interface 405 may include one or more tuners. A piece of multimedia content may be received at the network interface 405 as a stream, and the stream carrying the piece of content may be received through one of the one or more tuners of the network interface 405. The network interface 405 may include a plurality of tuners, and each tuner may be tuned to a channel over which a stream carrying a piece of media content may be received. As an example, where the network interface 405 has more than one tuner, a user may view content from a first channel on a display device connected to the multimedia device 310 while the multimedia device 310 records content received over one or more other channels. As another example, where the network interface 405 has more than one tuner, the multimedia device 310 may record content from a number of channels equal to the number of tuners in the network interface 405. It should be understood that a tuner may be a single device used to capture information related to a channel or program, or the tuner may be a virtual tuner that uses IP or other protocols to access information related to a specific channel or program.

In embodiments, a content stream received through a tuner of the network interface 405 may be passed through the client interface 415 to one or more display or client devices (e.g., client devices 320 of FIG. 3). For example, a tuner may receive a content stream from a channel designated for live viewing by a user, and the content stream may be passed to a destination through the client interface 415.

In embodiments, the recording module 420 may instruct a tuner of the network interface 405 to tune to a channel designated for recording. The recording module 420 may copy and/or forward content received over the channel to content storage 410. For example, when a user designates a channel for recording or pauses a channel, the recording module 420 may forward content associated with the channel to content storage 410.

In embodiments, the multimedia device 310 may communicate with one or more client devices 320 over a wired or a wireless connection through the client interface 415. The multimedia device 310 may output content and/or other services to client devices 320 through the client interface 415 and may receive requests for content and/or other upstream communications through the client interface 415. It should be understood that the client interface 415 may include various wired and/or wireless interfaces using various protocols and/or standards (e.g., Wi-Fi, multimedia over coax alliance (MoCA), ZigBee, Ethernet, etc.) that may be used to deliver communications between the multimedia device 310 and client device(s) 320. For example, the multimedia device 310 may communicate with one or more client devices 320 over a local network.

In embodiments, the treatment and/or output of content (e.g., both recorded and linear content) may be controlled by user requests received at the multimedia device 310 from a control device (e.g., RCU). For example, a user may view available content through a menu or guide (e.g., electronic program guide (EPG), VOD content list, etc.) displayed at a display device, and may select content for delivery from the multimedia device 310 to a client device 320. The user may control playback and recording functions at the multimedia device 310 using various buttons at a control device (e.g., record, play, fast-forward, rewind, skip, and other trickplay controls).

For a multimedia device 310 having a free tuner or frontend (e.g., tuner and DEMOD combination at the network interface 405), every time a channel change request is issued, the primary frontend is used to lock to the high-resolution (e.g., HD) channel associated with the channel identified in the channel change request, and if a lower resolution (e.g., SD) equivalent of the service is available, then another frontend is used to tune to the equivalent lower resolution service. Also, based on availability of resources, free PID filters, video and audio decoders can be used to start the video and audio decoding process for the lower resolution service before the actual switching process.

For a multimedia device 310 without a free frontend (e.g., where all the tuner+DEMOD at the network interface 405 are busy), when the quality of the high-resolution (e.g., HD) program drops below a certain level, the same frontend is used to switch to the equivalent lower resolution (e.g., SD) content. The tuning of the frontend from the high-resolution (e.g., HD) service to the lower resolution service is done without the user's intervention.

The determination as to when to initiate the switch from the high resolution program to the low resolution program or vice versa, is made by the service switching module 425 based on an algorithm. This algorithm takes into account the following signal statistic data from the frontend for both the high-resolution signal and the low-resolution signal: RS uncorrectable errors; RS corrected errors; Signal to Noise ratio (SNR); tuner lock status; DEMOD/FEC lock status; and/or others. The algorithm may use some/all of the parameters mentioned above to make the decision as to whether the content that is being transmitted in the signal being monitored is presentable to the user or not. Additionally, the algorithm may use one or more of the following parameters: video decoder error count; audio decoder error count.

Based on the output from the algorithm, an event is raised by the service switching module 425 when the signal conditions get poor (e.g., when the quality of the signal falls below a threshold level). Once the event is triggered, if free PID filters and video/audio decoders are available to the multimedia device 310, then these resources are used to decode the SD (e.g., lower resolution) content. At this point, the display (e.g., the output to one or more client devices 320) is still playing the HD content (high-resolution). Once the SD video is fit to be presented (e.g., after a short period of time such as 2 seconds for the video and audio decoders to stabilize and decode a first 'I' frame), the output path is switched from the primary decoders to the second set of decoders. Where free PID filters and video/audio decoder resources are not available, the same video and audio decoders that are playing HD content are used to decode the SD content, but the content is routed from the second frontend, that is locked to the SD signal. Where a free frontend resource is not available, the same frontend resource that is being used to lock to the HD content is switched to be used to lock to the SD content.

In the case of a multi-frontend multimedia device 310 with a free frontend resource, after switching to the low-resolution content, the high-resolution signal condition is monitored periodically (e.g., by the service switching module 425 through the first frontend resource that is locked to the high-resolution content), using the same algorithm described above. When the signal conditions recover to the point that determination is made that the high-resolution content is presentable, the high-resolution content is routed from the frontend locked to the high-resolution signal. Again, if free PID filters and video/audio decoders are available, the switch-over can be made as seamless as possible by continuing to decode the high-resolution content using the free PID filters and video/audio decoders.

In the case where a free frontend resource is not available, the user may be notified and the user can manually switch to the HD equivalent when the signal conditions for the HD content recover.

After a transponder is affected by noise, when making a new channel change request, a check is done (e.g., by the service switching module 425) to see if the signal of the new program belongs to the affected transponder list (a list maintained by the multimedia device 310, wherein the list comprises an identification of one or more transponders experiencing a drop in signal quality below a threshold level). If the new program is from the list of affected transponders, if an equivalent low-resolution service is available, the low-resolution program is picked and displayed to the user. The same applies to scheduled recordings, which start after the signal from the transponder carrying high-resolution is affected by noise (e.g., fading). By switching to, and displaying a low resolution offering of a program in response to a determination that a high resolution offering of the program has been negatively affected by noise, the user is presented with the best signal available.

The algorithm described above can be used to trigger switching between services of different transmission standards for multi-standard products (e.g., DVB-S2 (satellite) and DVB-T2/ISDB-T (Terrestrial) products where there are redundant transmissions in both satellite mode and terrestrial mode). The algorithm described above can be used to trigger switching between services of different PLP (Physical layer pipe) of DVB-T2 and DVB-S2, DVB-S2x, and others.

A list of alternative services that can be decoded by the multimedia device 310 is transmitted as user defined descriptor of SI (Service Information). The multimedia device 310 may utilize an algorithm to uniquely identify a service from any of the MPTS's. A list/array of, for example, 3 such structures, is used to uniquely identify the different services of the same content, across different TS's, satellite transponders/terrestrial channels. A new descriptor can be used to transmit this data and the data can be sent as part of SDT (Service Descriptor Table) and MW code may be modified, to decode the new user defined table and create a dynamic table which is looked up during channel change to identify the alternative services.

As an example, when a multimedia device 310 has 3 frontends, the second frontend is used to tune to the signal which carries the low-resolution content, when a channel change command to lock to the high-resolution channel is issued. The signal conditions of the primary channel (in this case, the high-resolution channel), locked by the first frontend is monitored in a thread. When the signal conditions get worse (i.e., the signal conditions drop below a threshold level), the same video and audio decoders are reconfigured to decode data from the SD transponder (second tuner). One of the SFU is used to simulate an HD transponder by setting it to DVB-S2 8PSK ⅗ (same setting as used for an HD transmission) and the other SFU is used to simulate an SD transponder by setting it to DVB-S QPSK ¾ (same as used for an SD transmission). When reducing the SNR on both the SFUs, at, for example, 6.7 dB SNR, the HD signal starts to macroblock, and further reducing the SNR triggers the HD-to-SD switchover algorithm and the SD program is displayed without the user's intervention. In embodiments, the algorithm does not wait for a loss of signal, but the decision is made when the number of macro-blocks in the video are high enough to affect the viewing experience. Similarly, when the SNR is increased from, for example 6.5 dB to 7.5 dB, the HD signal is clear without errors, the algorithm detects that the signal is fit to be presentable and triggers the switch-over algorithm to display the HD signal.

Figure 5:
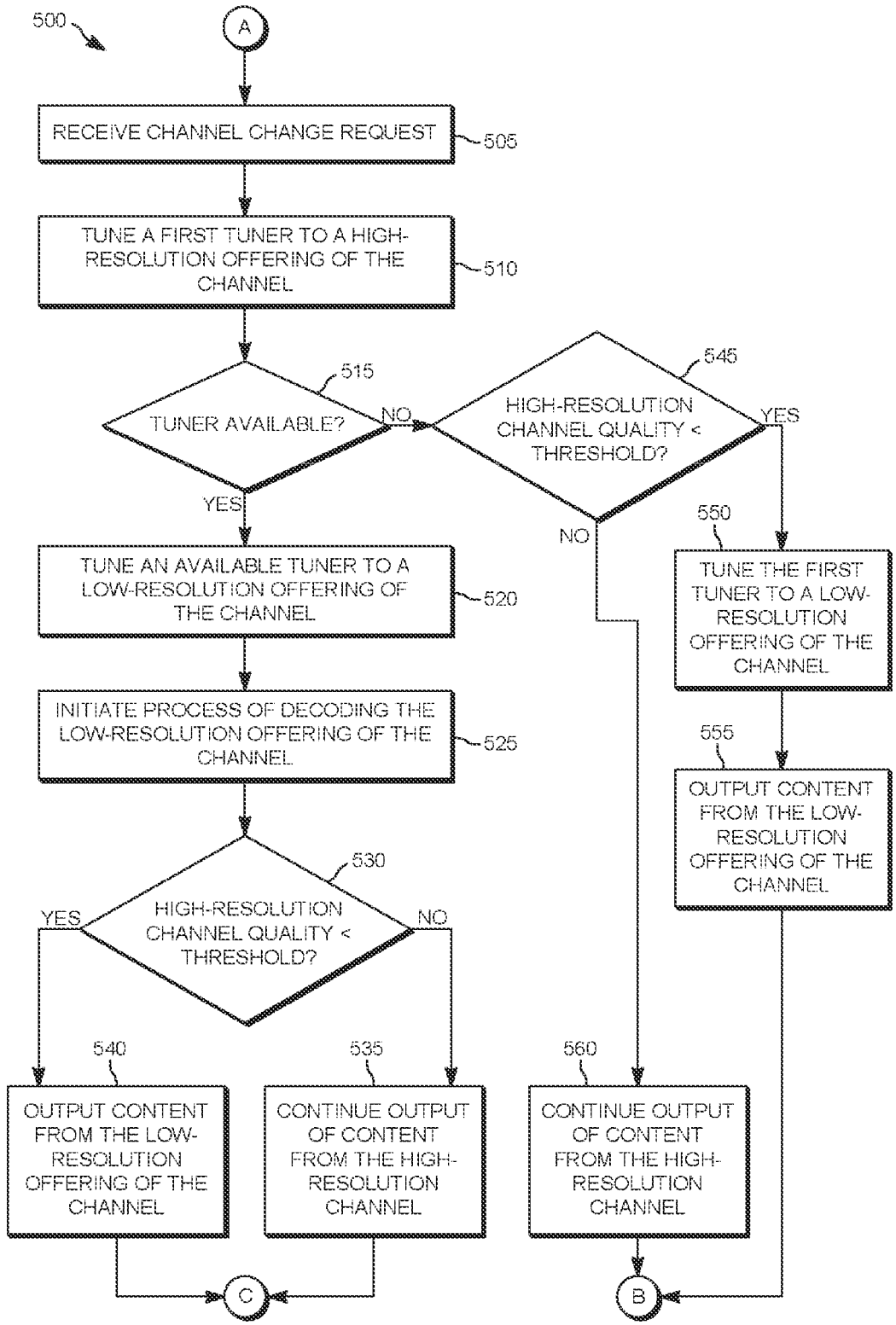
FIG. 5 is a flowchart illustrating an example process operable to facilitate the switching of an output of content from a high-resolution service to a low-resolution service.

FIG. 5 is a flowchart illustrating an example process 500 describing the steps followed when a channel change command is issued to the multimedia device. The process 500 may be carried out, for example, by a multimedia device (e.g., multimedia device 310 of FIG. 3). The process 500 may begin at step A when the multimedia device may be already playing a content or is in idle state, ready to play a content. At 505, the multimedia device 310 receives a channel change request for a new program.

At 510, the multimedia device 310 may identify a high-resolution offering of the channel identified from the channel change request, and the multimedia device 310 may tune a first tuner to the high-resolution offering of the channel.

At 515, a determination may be made whether a tuner other than the first tuner is available to the multimedia device 310. For example, if the multimedia device 310 has multiple tuners, the multimedia device 310 may determine whether at least one of the tuners other than the first tuner is not busy.

If, at 515, the determination is made that another tuner is available, the process 500 may proceed to 520. At 520, the multimedia device 310 may tune an available tuner to a low-resolution offering of the channel. It should be understood that the multimedia device 310 may keep the first tuner tuned to the high-resolution offering of the channel and may continue to output the content from the high-resolution offering of the channel to a display.

At 525, the multimedia device 310 may initiate a process of decoding the low-resolution offering of the channel.

At 530, a determination may be made whether the quality of the high-resolution offering of the channel has dropped below a threshold level. For example, the multimedia device 310 may run an algorithm utilizing one or more parameters of the signal received over the high-resolution offering of the channel to determine a current signal quality of the high-resolution offering of the channel. The threshold level may be a threshold signal quality level that indicates a potential for a degradation in the quality of video/audio that is output to a display.

If, at 530, the determination is made that the quality of the high-resolution offering of the channel has dropped below the threshold level, the process 500 may proceed to 540. At 540, the multimedia device 310 may output content from the low-resolution offering of the channel to a display. For example, the multimedia device 310 may output the content received and decoded by the tuner that is tuned to the low-resolution offering of the channel (e.g., the available tuner identified at 515). After initiating an output of content from the low-resolution offering of the channel, the process 500 may proceed to step C, at which point process 600 of FIG. 6 may be initiated.

If, at 530, the determination is made that the signal quality of the high-resolution offering of the channel is not less than the threshold level, the process 500 may proceed to 535. At 535, the multimedia device 310 may continue to output content from the high-resolution offering of the channel to a display. For example, the multimedia device 310 may continue to output content that is received over the first tuner. After initiating an output of content, the process 500 may proceed to step C, at which point process 600 of FIG. 6 may be initiated.

Returning to 515, if the determination is made that a tuner is not available, the process 500 may proceed to 545. At 545, with the first tuner remaining tuned to the high-resolution offering of the channel, a determination may be made whether the quality of the high-resolution channel has dropped below a threshold. For example, the multimedia device 310 may run an algorithm utilizing one or more parameters of the signal received over the high-resolution offering of the channel to determine a current signal quality of the high-resolution offering of the channel. The threshold level may be a threshold signal quality level that indicates a potential for a degradation in the quality of video/audio that is output to a display.

If, at 545, the determination is made that the quality of the high-resolution channel is not below the threshold, the process 500 may proceed to 560. At 560, the multimedia device 310 may continue to output content from the high-resolution offering of the channel to a display. For example, the multimedia device 310 may continue to output content that is received over the first tuner. After initiating an output of content, the process 500 may proceed to step B, at which point process 700 of FIG. 7 may be initiated.

If, at 545, the determination is made that the quality of the high-resolution channel is below the threshold, the process 500 may proceed to 550. At 550, the multimedia device 310 may tune the first tuner away from the high-resolution offering of the channel and to a low-resolution offering of the channel. The multimedia device 310 may output content from the low-resolution offering of the channel (i.e., the content received over the first tuner) at 555. After initiating an output of content from the low-resolution offering of the channel, the process 500 may proceed to step B, at which point process 700 of FIG. 7 may be initiated.

Figure 6:
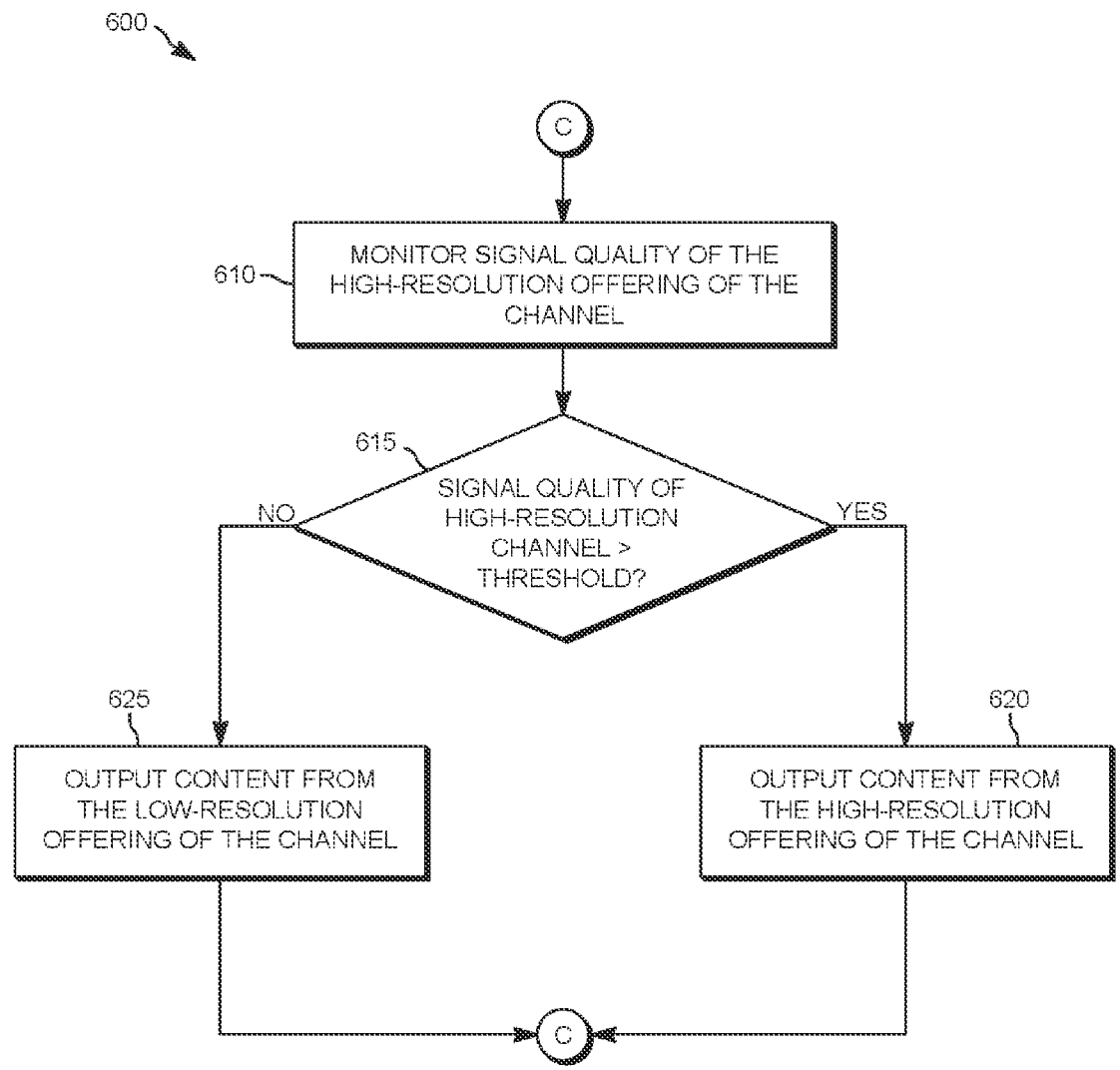
FIG. 6 is a flowchart illustrating an example process operable to facilitate the switching of an output of content from a low-resolution service to a high-resolution service.

FIG. 6 is a flowchart illustrating an example process 600 operable to facilitate the switching of an output of content between a low-resolution service and a high-resolution service when 2 frontends are available, and the frontends are locked to signals carrying services of different resolutions. The process 600 may be carried out, for example, by a multimedia device (e.g., multimedia device 310 of FIG. 3). In embodiments, the multimedia device 310 may initiate the process 600 at step C, at which point the multimedia device 310 has a first tuner tuned to a high-resolution offering of a requested channel and a second tuner tuned to a low-resolution offering of the requested channel, and the multimedia device 310 is outputting content from the low-resolution offering of the channel (e.g., content received through the second tuner) or the high-resolution offering of the channel (e.g., content received through the first tuner). In embodiments, the multimedia device 310 may output the content to a display or to a client device 320 of FIG. 3, wherein the output is received by the multimedia device 310 over the first or the second tuner. While the multimedia device 310 may output content from the low-resolution offering of the channel, the multimedia device 310 may continue to decode the high-resolution content being received over the first tuner.

At 610, the multimedia device 310 may monitor a signal quality of the high-resolution offering of the channel periodically. For example, the multimedia device 310 may monitor the quality of the signal received over the first tuner (e.g., the tuner that is tuned to the high-resolution offering of the channel). In embodiments, the multimedia device 310 may generate one or more observed parameters of the signal received over the first tuner.

At 615, a determination may be made whether the quality of the high-resolution offering of the channel is above a threshold level. For example, the multimedia device 310 may run an algorithm utilizing one or more parameters of the signal received over the high-resolution offering of the channel to determine a current signal quality of the high-resolution offering of the channel. The threshold level may be a threshold signal quality level that indicates the quality of the output audio/video is at an acceptable level.

If, at 615, the determination is made that the signal quality of the high-resolution channel is above the threshold, the process 600 may proceed to 620. At 620, the multimedia device 310 may output content from the high-resolution offering of the channel. For example, the multimedia device 310 may switch from outputting content received through the second tuner (e.g., the tuner receiving the low-resolution offering of the channel) to outputting content received through the first tuner (e.g., the tuner receiving the high-resolution offering of the channel).

If, at 615, the determination is made that the signal quality of the high-resolution channel is not above the threshold, the process 600 may proceed to 625. At 625, the multimedia device 310 may output content from the low-resolution offering of the channel. For example, the multimedia device 310 may switch from outputting content received through the first tuner (e.g., the tuner receiving the high-resolution offering of the channel) to outputting content received through the second tuner (e.g., the tuner receiving the low-resolution offering of the channel).

This process is repeated in a loop as long as the channel is watched or recorded by the device.

Figure 7:
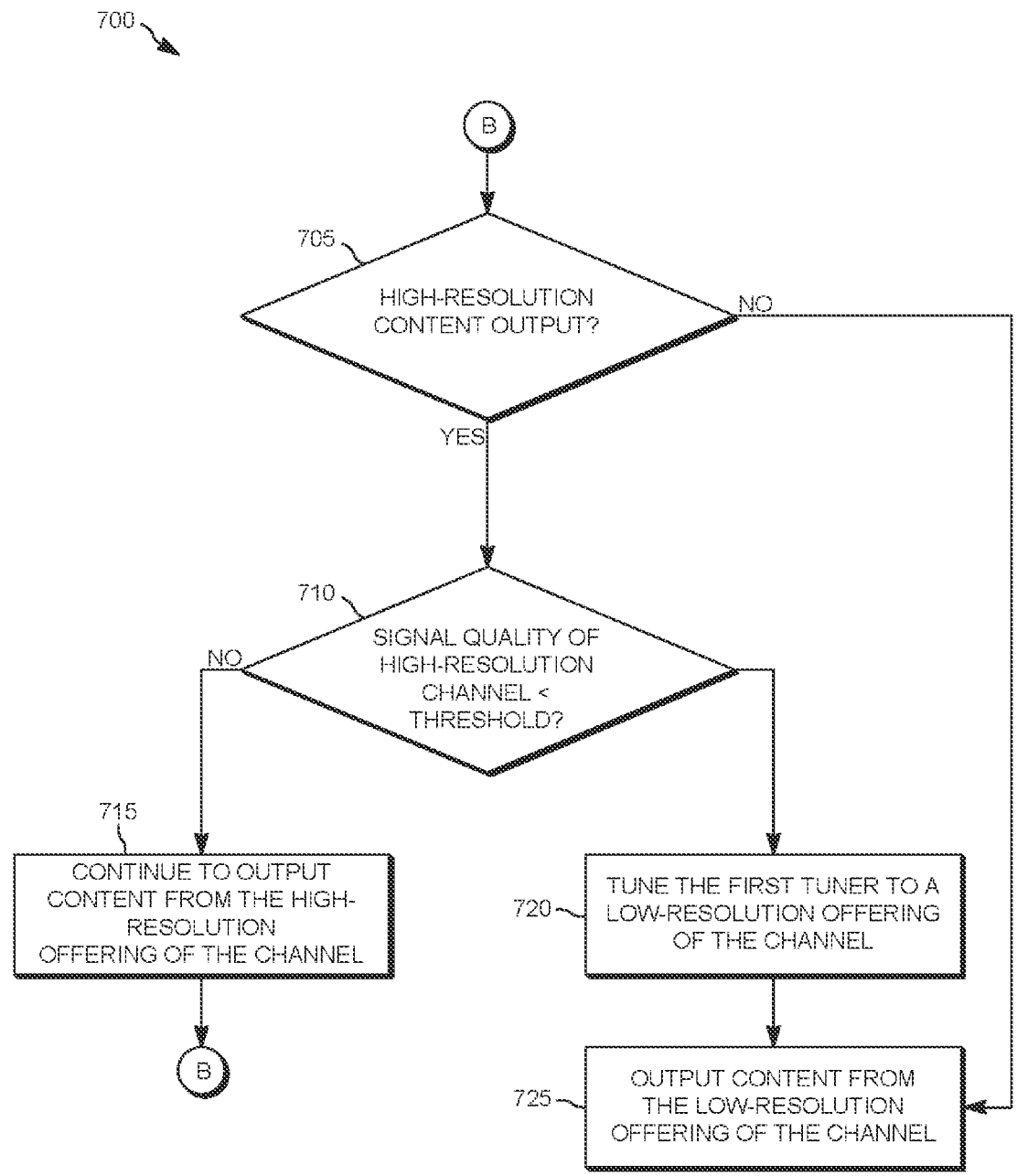
FIG. 7 is a flowchart illustrating an example process operable to facilitate channel change request when only a single tuner is available.

FIG. 7 is a flowchart illustrating an example process 700 operable to facilitate the switching of an output of content from a high-resolution service to a low-resolution service when only a single tuner is available. The process 700 may be carried out, for example, by a multimedia device (e.g., multimedia device 310 of FIG. 3). In embodiments, the multimedia device 310 may initiate the process 700 at step B, at which point the multimedia device 310 has a first tuner tuned to a low-resolution or high-resolution offering of a requested channel, and the multimedia device 310 is outputting content of appropriate resolution offering of the channel (e.g., content received through the first tuner).

At 705, a determination may be made whether the output is from the high-resolution offering of the channel received at the multimedia device 310.

If, at 705, the determination is made that the output is from the high-resolution offering of the channel, the process 700 may then proceed to 710.

At 710, a determination may be made whether the quality of the high-resolution offering of the channel is below a threshold level. For example, the multimedia device 310 may run an algorithm utilizing one or more parameters of the signal received over the high-resolution offering of the channel to determine a current signal quality of the high-resolution offering of the channel. The threshold level may be a threshold signal quality level that indicates the quality of the output audio/video is at an non acceptable level affecting viewing experience.

If, at 710 the determination is made that the signal quality of the high-resolution channel is not below the threshold, the process 700 may proceed to 715. At 715, the multimedia device 310 may continue the output of content from the high-resolution offering of the channel. For example, the multimedia device 310 may output content received through the first tuner (e.g., the tuner receiving the high-resolution offering of the channel).

If, at 710 the determination is made that the signal quality of the high-resolution channel is below the threshold, the process 700 may proceed to 720. At 720, the multimedia device 310 may tune the first tuner away from the high-resolution offering of the channel and to a low-resolution offering of the channel. The multimedia device 310 may output content from the low-resolution offering of the channel (i.e., the content received over the first tuner) at 725.

Returning to 705, if the determination is made that the high-resolution content is not being currently output, then the process 700 proceeds to 725, where the output from the low-resolution content is continued to be displayed, until a new channel change request is made. When new channel change request is made, the process 500 is invoked.

Figure 8:
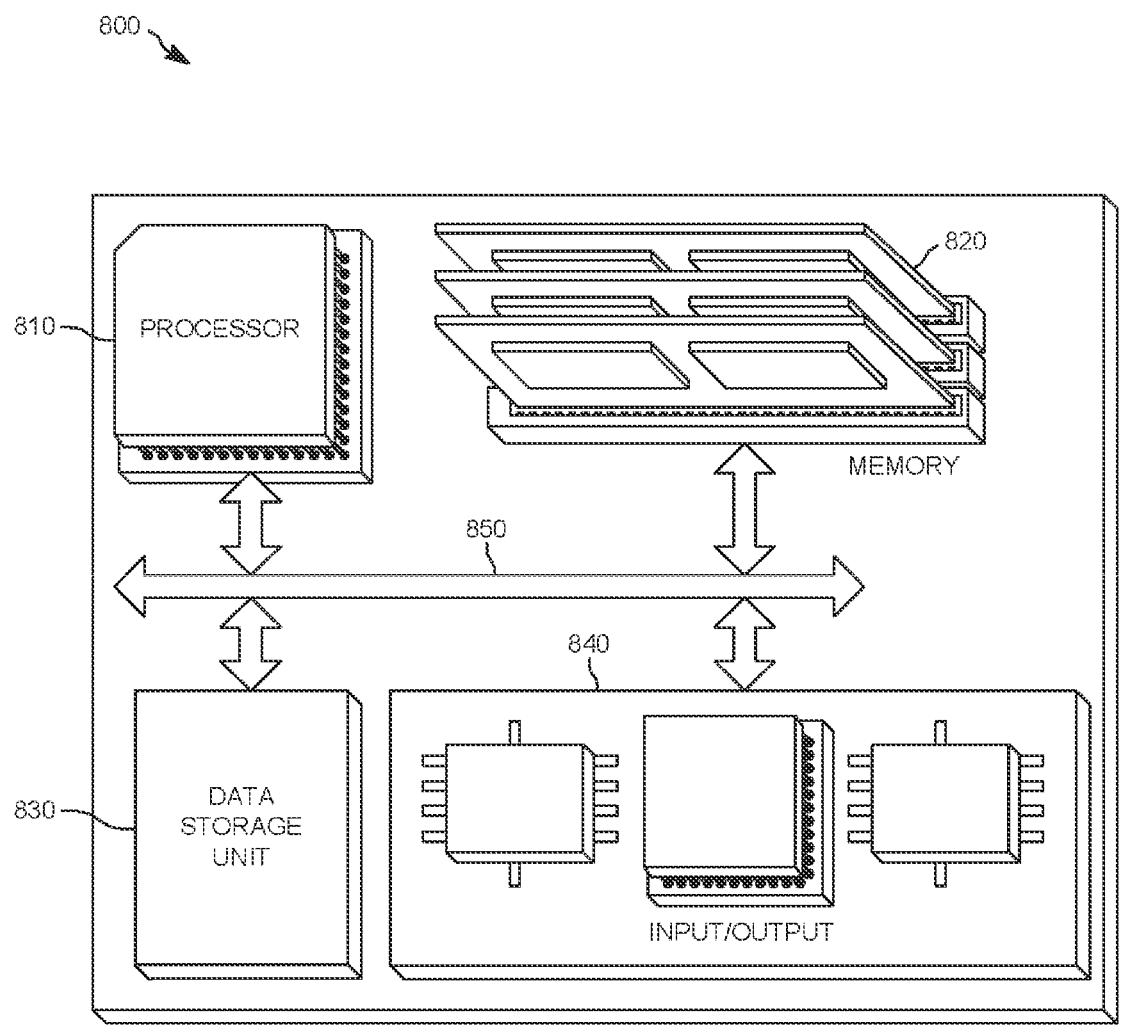
FIG. 8 is a block diagram of a hardware configuration operable to facilitate switching the video and audio output to a different service when a current service is not presentable.

FIG. 8 is a block diagram of a hardware configuration 800 operable to facilitate switching the video and audio output to a different service when a current service is not presentable. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

Figure 1:
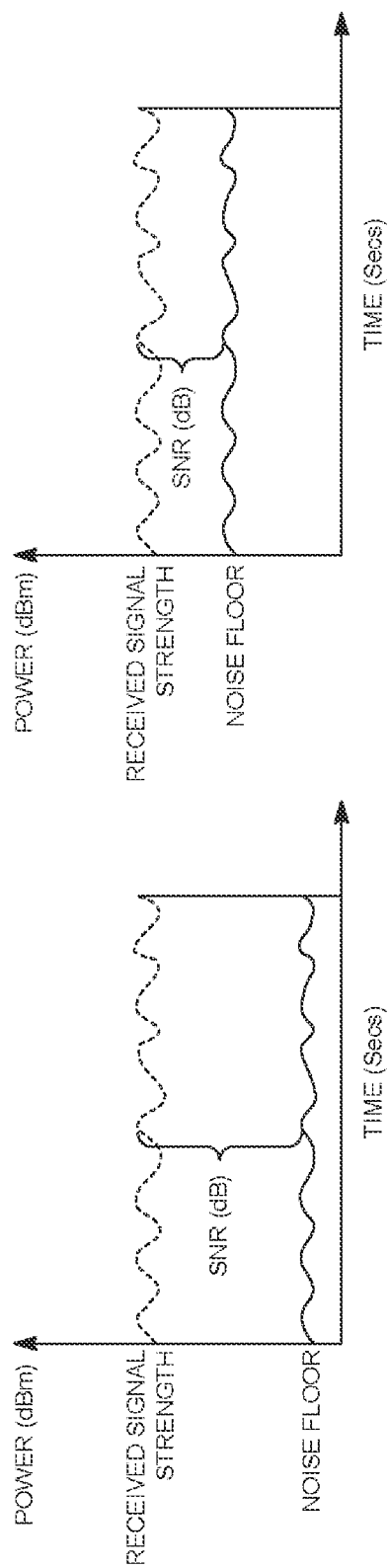
FIG. 1 shows two charts representing how noise affects the SNR (Signal to noise ratio).
Figure 2:
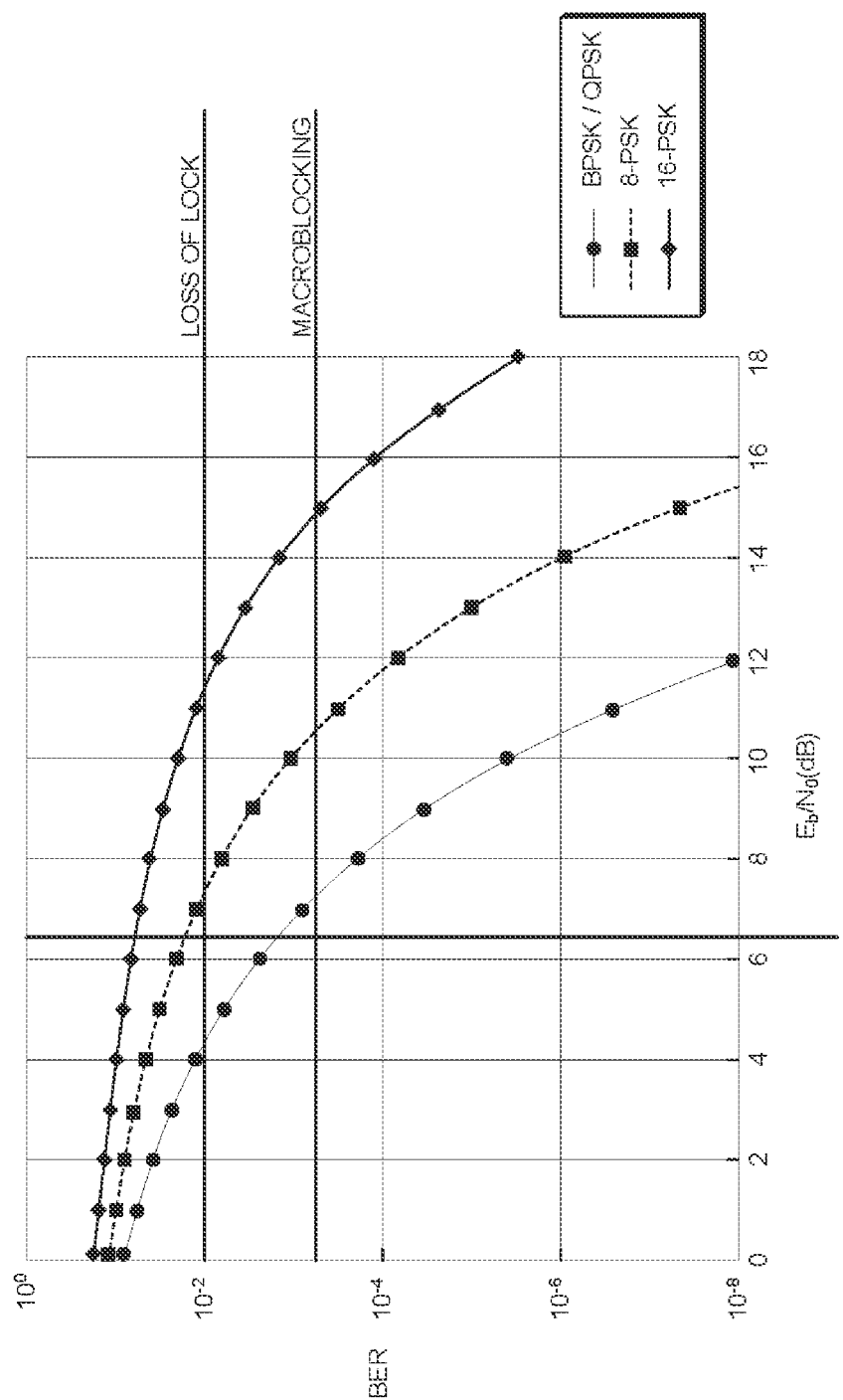
FIG. 2 shows a chart representing, when the SNR reduces in steps (i.e., when the gap between the wanted signal and noise narrows), content that is transmitted in 8-PSK starts to macroblock first, before the content that is transmitted in QPSK starts to macroblock.

The input/output device 840 provides input/output operations for the hardware configuration 800. In one implementation, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 120 of FIG. 1 (e.g., STB, computer, television, tablet, mobile device, etc.). In another implementation, the input/output device can include driver devices configured to send communications to, and receive communications from one or more networks (e.g., WAN 140 of FIG. 1, local network 130 of FIG. 1, provider network 150 of FIG. 1, etc.).

Those skilled in the art will appreciate that the invention described herein improves upon methods and systems for switching content output. Methods, systems, and computer readable media may be operable to facilitate switching the video and audio output to a different service when a current service is not presentable. When outputting content from a first service, a multimedia device may identify and switch to an output of content from a second service when the content from the first service becomes unpresentable. The multimedia device may continue to monitor the quality or presentability of the content from the first service, and the multimedia device may switch from an output of content form the second service to an output of content from the first service when the determination is made that the content from the first service is presentable.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving a channel change request to a first channel;
   tuning a first tuner of a multimedia device to the first channel, wherein the first channel comprises a first service;
   identifying a second channel comprising a second service that is associated with the first service;
   determining a second tuner of the multimedia device is available;
   in response to determining the second tuner of the multimedia device is available:
      locking the first tuner of the multimedia device to the first channel, and
      tuning the second tuner of the multimedia device to the second channel;
   monitoring a signal quality of the first channel;
   determining that the signal quality of the first channel is below a threshold quality level; and
   switching an output of content from the first channel to the second channel.

2. The method of claim 1, wherein the tuning the second tuner of the multimedia device to the second channel is done before the determining that the signal quality of the first channel is below a threshold quality level; and
   using the first tuner to tune to the second channel when the second tuner is not available.

3. The method of claim 1, wherein the first service comprises a high-resolution offering and the second service comprises a low-resolution offering.

4. A multimedia device that:
   receives a channel change request to a first channel;
   tunes a first tuner of a multimedia device to the first channel, wherein the first channel comprises a first service;
   identifies a second channel comprising a second service that is associated with the first service;
   determines a second tuner of the multimedia device is available;
   in response to determining the second tuner of the multimedia device is available:
      locking the first tuner of the multimedia device to the first channel, and
      tuning the second tuner of the multimedia device to the second channel;
   monitors a signal quality of the first channel;
   determines that the signal quality of the first channel is below a threshold quality level; and
   switches an output of content from the first channel to the second channel.

5. The multimedia device of claim 4, wherein the tuning the second tuner of the multimedia device to the second channel is done before the determining that the signal quality of the first channel is below a threshold quality level.

6. The multimedia device of claim 4, wherein the first service comprises a high-resolution offering and the second service comprises a low-resolution offering.

7. One or more non-transitory computer readable media having instructions operable to cause one or more processors to perform the operations comprising:
   receiving a channel change request to a first channel;
   tuning a first tuner of a multimedia device to a first channel, wherein the first channel comprises a first service;
   identifying a second channel comprising a second service that is associated with the first service;
   determining a second tuner of the multimedia device is available;
   in response to determining a second tuner of the multimedia device is available:
      locking the first tuner of the multimedia device to the first channel, and
      tuning the second tuner of the multimedia device to the second channel;
   monitoring a signal quality of the first channel;
   determining that the signal quality of the first channel is below a threshold quality level; and
   switching an output of content from the first channel to the second channel.

8. The one or more non-transitory computer readable media of claim 7, wherein the tuning the second tuner of the multimedia device to the second channel is done before the determining that the signal quality of the first channel is below a threshold quality level.

9. The one or more non-transitory computer readable media of claim 7, wherein the first service comprises a high-resolution offering and the second service comprises a low-resolution offering.

10. A method comprising:
tuning a first tuner of a multimedia device to a first channel, wherein the first channel comprises a first service;
determining a second tuner of the multimedia device is available;
in response to determining a second tuner of the multimedia device is available:
  locking the first tuner of the multimedia device to the first channel, and
  tuning a second tuner of a multimedia device to a second channel, wherein the second channel comprises a second service;
outputting a content from the second channel;
monitoring a signal quality of the first channel;
determining that the signal quality of the first channel is above a threshold quality level; and
switching an output of content from the second channel to the first channel.

11. The method of claim 10, further comprising:
tuning a first tuner of the multimedia device to the first channel before determining that the signal quality of the first channel is above a threshold quality level.

12. The method of claim 10, wherein the first service comprises a high-resolution offering and the second service comprises a low-resolution offering.

13. The method of claim 10, where the signal quality of the first channel is monitored continuously to determine if the signal quality is above a threshold quality level.

14. The method of claim 10, where the threshold quality level for switching from high-resolution content to low-resolution content is different from the threshold quality level for switching from low-resolution content to high-resolution content.

15. The method of claim 1, wherein a list of affected transponders is maintained, and when the channel change request to the first channel is made, if the first channel is part of the list of affected transponders, then the second channel is tuned and content is output from the second channel.

16. The method of claim 1, wherein the determining that the signal quality of the first channel is below a threshold quality level is based on an algorithm including one or more parameters: signal statistic data of the first and/or second channel; RS uncorrectable errors, RS correctable errors, signal to noise ratio (SNR), tuner lock status, DEMOD/FEC lock status, video decoder error count, and audio decoder error count.

17. The method of claim 1, further comprising:
in response to switching the output of content from the first channel to the second channel, monitoring the signal quality of the first channel;
determining the signal quality of the first channel is above the threshold quality level; and
switching the output of content back to the first channel from the second channel.

18. The multimedia device of claim 4, wherein the determining that the signal quality of the first channel is below a threshold quality level is based on an algorithm including one or more parameters: signal statistic data of the first and/or second channel; RS uncorrectable errors, RS correctable errors, signal to noise ratio (SNR), tuner lock status, DEMOD/FEC lock status, video decoder error count, and audio decoder error count.

19. The multimedia device of claim 4, further comprises:
in response to switching the output of content from the first channel to the second channel, monitoring the signal quality of the first channel;
determining the signal quality of the first channel is above the threshold quality level; and
switching the output of content back to the first channel from the second channel.

20. The one or more non-transitory computer readable media of claim 7 having instructions operable to cause one or more processors to perform the operations further comprising:
in response to switching the output of content from the first channel to the second channel, monitoring the signal quality of the first channel;
determining the signal quality of the first channel is above the threshold quality level; and
switching the output of content back to the first channel from the second channel.

* * * * *